(12) United States Patent
Bolignano

(10) Patent No.: US 9,892,016 B2
(45) Date of Patent: *Feb. 13, 2018

(54) METHOD FOR SECURING A PROGRAM

(71) Applicant: Dominique Bolignano, Paris (FR)

(72) Inventor: Dominique Bolignano, Paris (FR)

(*) Notice: Subject to any disclaimer, the term of this patent is extended or adjusted under 35 U.S.C. 154(b) by 0 days.

This patent is subject to a terminal disclaimer.

(21) Appl. No.: 15/342,698

(22) Filed: Nov. 3, 2016

(65) Prior Publication Data

US 2017/0075788 A1 Mar. 16, 2017

Related U.S. Application Data

(63) Continuation of application No. 13/777,524, filed on Feb. 26, 2013, now Pat. No. 9,501,383.

(51) Int. Cl.
| | |
|---|---|
| *G06F 9/44* | (2006.01) |
| *G06F 11/36* | (2006.01) |
| *G06F 9/45* | (2006.01) |
| *G06F 9/30* | (2006.01) |
| *G06F 9/38* | (2006.01) |

(52) U.S. Cl.
CPC .......... *G06F 11/3608* (2013.01); *G06F 8/443* (2013.01); *G06F 8/75* (2013.01); *G06F 9/4425* (2013.01); *G06F 11/362* (2013.01); *G06F 11/3664* (2013.01); *G06F 8/452* (2013.01); *G06F 9/30178* (2013.01); *G06F 9/3808* (2013.01)

(58) Field of Classification Search
None
See application file for complete search history.

(56) References Cited

U.S. PATENT DOCUMENTS

| | | | | |
|---|---|---|---|---|
| 5,963,741 | A | 10/1999 | Horikawa | |
| 6,292,940 | B1 | 9/2001 | Sato | |
| 6,327,704 | B1* | 12/2001 | Mattson, Jr. | ........ G06F 9/45516 712/234 |
| 6,550,056 | B1* | 4/2003 | Mizumoto | .......... G06F 11/3664 714/E11.21 |
| 7,124,407 | B1 | 10/2006 | Wallman | |

(Continued)

OTHER PUBLICATIONS

Application and File history for U.S. Appl. No. 13/930,580, filed Jun. 28, 2013. Inventor: Dominique Bolignano.

(Continued)

*Primary Examiner* — Lewis A Bullock, Jr.
*Assistant Examiner* — Tina Huynh
(74) *Attorney, Agent, or Firm* — Patterson Thuente Pedersen, P.A.

(57) ABSTRACT

A method for securing a first program, the first program including a finite number of program points and evolution rules associated to program points and defining the passage of a program point to another, the method including defining a plurality of exit cases and, when a second program is used in the definition of the first program, for each exit case, definition of a branching toward a specific program point of the first program or a declaration of branching impossibility, defining a set of properties to be proven, each associated with one of the constitutive elements of the first program, said set of properties comprising the branching impossibility as a particular property and establishment of the formal proof of the set of properties.

18 Claims, 1 Drawing Sheet

(56) References Cited

U.S. PATENT DOCUMENTS

| | | |
|---|---|---|
| 9,275,236 B2 | 3/2016 | Bolignano |
| 2001/0037492 A1 | 11/2001 | Holzmann |
| 2002/0046393 A1* | 4/2002 | Leino ................. G06F 9/44589 |
| | | 717/146 |
| 2003/0226060 A1 | 12/2003 | Das et al. |
| 2004/0031025 A1 | 2/2004 | Brisset |
| 2008/0162885 A1 | 7/2008 | Wang et al. |
| 2009/0222792 A1 | 9/2009 | Shanbhogue et al. |
| 2009/0276763 A1 | 11/2009 | Gulwani et al. |
| 2009/0282289 A1* | 11/2009 | Nori .................... G06F 11/3608 |
| | | 714/38.1 |
| 2010/0070804 A1* | 3/2010 | Bolignano .............. G06F 11/28 |
| | | 714/38.13 |
| 2010/0146624 A1 | 6/2010 | Meyer et al. |
| 2011/0191761 A1 | 8/2011 | Doyle et al. |
| 2011/0321002 A1 | 12/2011 | Chen et al. |
| 2013/0055033 A1 | 2/2013 | Frazier et al. |
| 2014/0245259 A1 | 8/2014 | Bolignano |
| 2015/0007333 A1 | 1/2015 | Bolignano |

OTHER PUBLICATIONS

File history for U.S. Appl. No. 13/777,524, filed Feb. 26, 2013. Inventor: Dominique Bolignano.
Search Report dated Nov. 19, 2014 for PCT Application No. PCT/IB2014/061753, 4 pages.

* cited by examiner

METHOD FOR SECURING A PROGRAM

RELATED APPLICATION

This application is a continuation of application Ser. No. 13/777,524 filed Feb. 26, 2013, which is hereby fully incorporated herein by reference.

TECHNICAL FIELD

The present invention relates to a method for securing a program as well as a computer software product implementing the method.

BACKGROUND OF THE INVENTION

By securing the program it should be understood that in this document, the program is written in order to guarantee operating in accordance with the specifications or the operating constraints, or that some of its (local) properties (as defined below) are proven correct.

In an automatic controlling equipment of a system, such as a rocket or a train, it is necessary to ensure that the program executes exactly within its operating range in order to prevent to jeopardize the system or the environment thereof.

This appears as particularly important in complex systems because these, owing to their complexity, are very difficult to analyze by specialists. This difficulty can be illustrated by the accident that occurred during the first flight of the Ariane V rocket, which after expertise, turned out to be due to a thrust engine control computer. In fact, the latter was programmed for the previous generation rocket Ariane IV that, less powerful, had less strong accelerations. The transfer of this computer onto the Ariane V rocket without taking this new parameter into consideration led the latter to receive acceleration data, which triggered an unanticipated register overflow and a motor control malfunction.

Thus, it appears extremely important, for critical systems that the execution domain as well as the execution within this domain to be perfectly defined, documented and verified.

The currently-used techniques are mainly based on mathematical rules based on first-order logic, or high-order logic such as Coq. They consist in using specific programming languages with software tools which will attempt to prove, in the mathematical sense. These software programs are called in the literature "provers".

The operation of these provers fundamentally consists in transcribing the studied program into logical assertions (i.e. "proof obligations") to be proven. Another possibility is to use the logical language itself, such as Coq, in order to describe the programs, express the properties and prove, thus avoiding the need for transformation into logical assertions.

However, it appears that the complexity, in the algorithmic sense, of the search for logic proofs increases faster than the complexity of the studied program. In the case of a computer-assisted proof, it appears that the user finds it difficult to use the intuition he has for the good operating of the program, in order to guide the prover. These techniques thus, become very difficult and high consumers of time and resources as soon as working on critical and complicated programs, such as control programs and/or complex system where security is involved. Thus, while the need has become more and more important and research teams have been working on this subject for at least 30 years, these proof technologies have remained in the laboratories or are used in extremely demanding sectors regarding operational security such as aerospace or rail with, hence, in this case, a software architecture which makes it possible to cut these programs into sub-assemblies that can be managed by the provers.

It would be thus advantageous to obtain a method for securing a program which would be adapted for usage on complex programs. From now on, the term "proof" (or "formal proof") will be used as a synonym for "formal verification", i.e. verification based on formal methods in general, and the term "logic proof" for the specific case of proof in classic logic systems (predicate logic, higher-order logic).

SUMMARY

In order to resolve one or several of the aforementioned drawbacks, in an embodiment, a method for securing a first program, the first program comprising a finite number of program points and evolution rules associated to the program points and defining the passage from one program point to another, comprises a definition of a plurality of exit cases and, when a second program is used/called in the definition of the first program, for each exit case of the second program, definition of a branching toward a specific program point of the first program or a declaration of branching impossibility; and a definition of a set of properties to be proven, each associated to one or more of the constitutive elements of the first program, said set of properties comprising the branching impossibility as a particular property; and establishment of the formal proof of the set of properties.

Thus, by using the path logic intrinsically included in the program, it is possible to reduce the size and complexity of the graph on which the prover will execute.

Characteristics or particular embodiments can be used singly or in combination. Embodiments include evolution rules, exit points and branchings defining a tree structure of execution traces or of logic traces (i.e. each logic trace representing a usually infinite set of execution traces corresponding to the same choice of cases and branchings), a prover uses the created tree structure to propagate constraints at points of the first program and uses transitive closure of the explicit or implicit congruences in the program (i.e. transitive congruence closure) in order to prove at least one of the properties of the first program (i.e. in order to secure the first program).

In an embodiment, the first program comprising a loop, a prover automatically generates an invariant at one program point by using potentially approximate versions of execution routes which lead thereto, wherein the parts representing the execution of the loops have been replaced with approximate steps.

In an embodiment, a branching declared as "impossible" is proven by analyzing the tree structure routes leading to the transition.

In an embodiment, securing a first program is based on securing a third program exhibiting functionalities different from the first program, and/or not only being merely an abstraction of the first program.

In an embodiment, oriented correspondences, called sufficiency relationships, between at least one of the local properties (i.e. properties associated to components of the program, including potentially the program itself) of the first program and at least one of the local properties of the third program are established, such that for proving a local property of the first program, it is sufficient to prove the set of properties of the third program which are in correspondence with this property of the first program, whenever such correspondences exist.

In an embodiment, the third program is modified by a transformation making it possible to obtain the first program, such that the securing of the first program is based on the securing of the third program.

In an embodiment, the first program is modified by a transformation making it possible to obtain the third program, such that the securing of the first program is based on the securing of the third program.

In an embodiment, the first program is modified by a transformation making it possible to obtain the third program and to establish a plurality of sufficiency relationships oriented between at least one of the respective properties of the first and third programs.

In an embodiment, the third program is modified by a transformation making it possible to obtain the first program and to establish a plurality of sufficiency relationships between at least one of the respective properties of the first and third programs.

In an embodiment, at least one of the variables of the third program is instantiated by means of the (logical) values taken by the variables of the first program in order to establish at least a sufficiency relationship between the first program and the third program; or as a way of securing the first program and/or at least a property is defined by a fourth program.

According to a second embodiment of the invention, a computer software product comprises software instructions for implementing the aforementioned method when said computer software product is executed on a computer.

In particular embodiments, software instructions for implementing the aforementioned method when said computer software product is executed on a computer are usable on their own or in combination:

In an embodiment, a computer software product comprising software instructions for implementing the aforementioned method comprises a user interface adapted to allow a user to define exit cases and the associated branchings, and properties to prove.

In an embodiment, the user interface is adapted to make it possible to define an impossible branching; and/or in an embodiment, the user interface is adapted to make it possible to define entry conditions of a particular branching and thus, limit the exit case(s).

In an embodiment, the tool generates implementation code in a way that take advantage of the fact that some of the impossible transitions or local properties have been proven so to optimize the generated code.

The above summary of the invention is not intended to describe each illustrated embodiment or every implementation of the various claimed inventions. The figures and the detailed description that follow more particularly exemplify these embodiments.

BRIEF DESCRIPTION OF THE DRAWINGS

The invention will be better understood upon reading the following description, by way of example and with reference to the accompanying drawings, in which.

Figure 1:
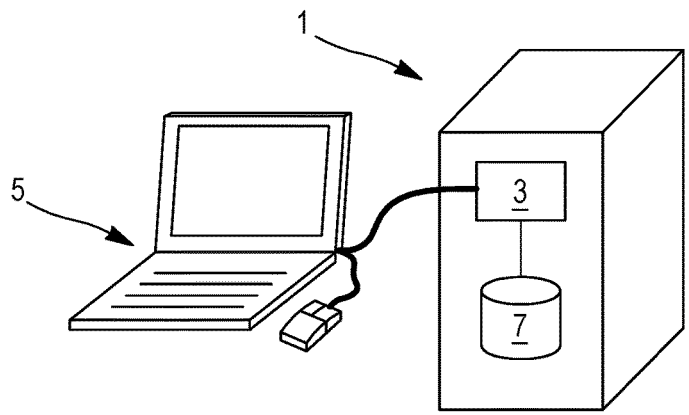
FIG. 1 is a schematic view of a computer system for implementing an embodiment of the invention.
Figure 2:
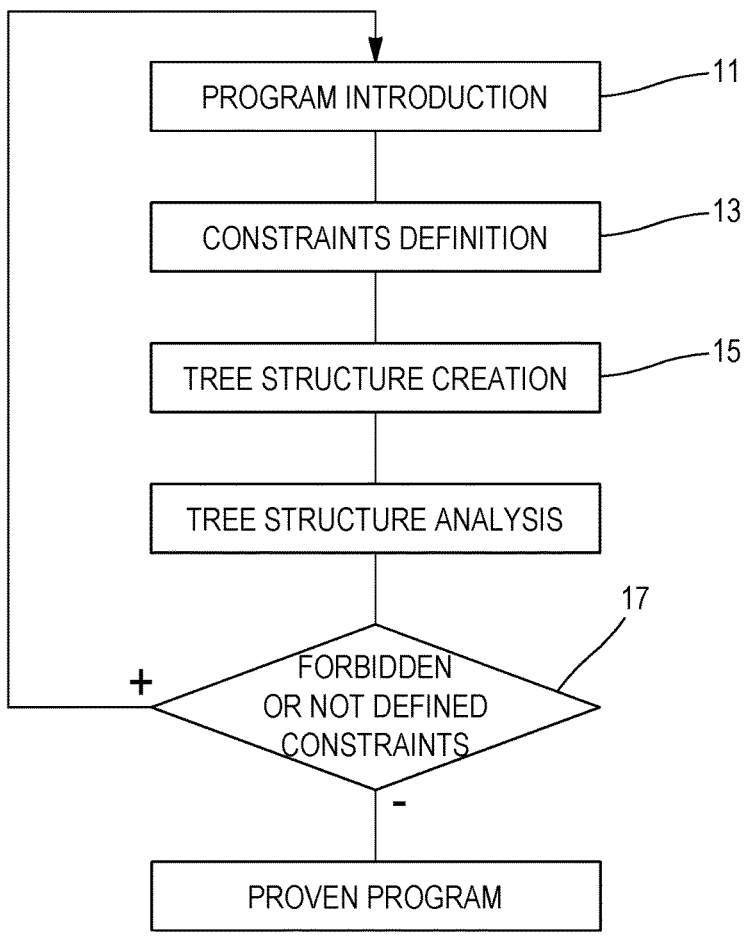
FIG. 2 is a flowchart for operating an embodiment of the invention.

While the invention is amenable to various modifications and alternative forms, specifics thereof have by shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION OF THE DRAWINGS

In the following text, in order to clarify the vocabulary, the terms "program", or "program to secure" or "program to prove" will be exclusively used to name the computer software being secured. The other computer software which participate in or execute the steps of the securing method will be called "software(s)" or "computer software(s)" or "software tool(s)".

In reference to FIG. 1, in an embodiment, a computer system 1 comprises means 3 for computing and memorizing as well as a human-machine interface device 5, typically of screen type, keyboard and mouse. It also comprises storage means 7 in the form of hard disks, solid disks or any other classic data storage means.

The human-machine interface is adapted to allow a user to give directives to a computer software running on this computer system 1 and view the analysis results provided by this software.

The human-machine interface 5 comes in the form of a program development environment with the associated tools. Thus, it comprises software of text editing type, parser, compiler, etc. The Eclipse environment, written in Java, is an example of such an environment.

In a first step of the securing method, according to an embodiment, step 11, a program is introduced on the human-machine interface to a user. This program is classically introduced in the form of a text file containing instructions, or execution controls, sequenced in a high-level language. Although, as it will be presented hereinafter, certain languages are more adapted than others for implementing the securing method, the program could have been written in any normally used programming language such as C, C++, ADA, Java, PHP, Erlang, Python, assembler, etc.

It is worth noting that the method can also be applied to programs written in more graphic languages, of state machine type, in other embodiments.

In an embodiment, the program is thus generally composed of a set of run commands, each command being typically associated with a program point. These commands are combined by means of structuring instructions, such as choices ("if . . . then . . . else"), loops ("while . . . do . . . "), etc. The structure can also be graphically represented. The branches and their annotations associated to a program point can generally be considered as the evolution rules for the given program point.

It is worth noting that this definition of a program makes it possible to have a recursive view: a first program to secure is used/referenced in a second program, etc.

For a program, sub-program or run command, operating ranges or execution constraints as well as the associated branchings are defined in step 13, in an embodiment.

A runtime constraint consists in defining a domain in which the program, command has a homogenous behavior. For example, in the simple case of a run command or program consisting in a division, two domains are naturally defined: normal execution, and divisor equal to zero. Each domain is associated with a particular processing and defines a branching following this processing. For example, the normal execution will lead to the execution of the following command in the program in which this command is used according to "normal" structuring of the program whereas in the case where the divisor is equal to zero will lead to another type of branching, for example to error, or branching towards a specific processing. Each runtime constraint and its associated branching thus define a path rule. This generally leads to defining programs having several exit cases. The thus defined program, if used in a second program, will hence have its exit cases associated to branchings in the second program, in an embodiment.

These definitions of path rules can be carried out in different ways.

A first embodiment consists in that the human-machine interface and/or the programming language of the program provide tools allowing the user to "manually" define these path rules.

A second embodiment consists in using libraries and sequence recognition software, which will automatically define these path rules. For example, this recognition software can search for the divisions contained within the program and apply the path rules thereto, such as defined above.

A third embodiment, that which will be the most illustrated further on, consists in defining for each program or command a finite set of exit cases, such as to only have to choose the relevant cases upon using them (the others being called here impossible cases or branching), as well as the branching corresponding to the relevant cases.

At step 15, the logic tree structure of a sequence of cases is used for simplification or proof purposes. The tree structure is that obtained by following the processing execution order (case taken for a command or a program) and the associated branchings, the tree structure representing a set of execution traces or routes or as will be seen later on a set of logic traces, each logic trace representing a usually infinite set of execution traces corresponding to the same choice of cases (and branchings). Any other means of proof can be also used to prove the local properties or impossible branches.

In order to repeat the example of division, the associated tree structure comprises arcs representing the two execution routes: the normal execution and the error execution.

It is worth noting that the tree structure is created by taking into account the program structuring logic. The advantage of this, with respect to a purely logic flattening is to substantially limit the tree structure complexity. If for example, before the division, the program has a divisor test different from zero, the error handling program arc corresponding to the division by zero will not be generated, or can be deleted, as it is "impossible" to take.

When the program comprises a loop, either there is an infinite tree structure, or the tree structure is created by defining an invariant on an execution trace by identifying the routes without loops and duplicating variables possibly modified by the loops. This makes it possible in this second case to create a tree structure as defined by a graph without loops.

Thus, it is advantageous that the human-machine interface makes it possible to define, or that the recognition software defines, an impossible transition between two sequences. In fact, this makes it possible to define a local property, that is to say, the fact that the transition in this execution place of the program is not possible, and moreover allows to reduce the tree structure considering that it is not necessary to develop "impossible" arcs. Likewise, one can express and prove that a transition is impossible one can declare or prove more generally that a sub-graph is impossible (that is to say that it cannot be used), and one can also annotate the more classic program of local properties (for example Floyd) that must be proven.

In the example of the division, according to an embodiment, a user interface makes it possible to define, or that the recognition software defines the entry conditions of a fragment of a particular program in order to limit the execution domain(s) of said fragment.

At step 17, if there are properties that remain to be proven, particularly branches declared impossible and non-proven, the method returns to step 11, either to complete the execution paths which were not defined, or modify the logic of the program so that the forbidden modes cannot occur.

In order to carry out this tree structure analysis, a prover should use the created tree structure to propagate constraints at program points and use transitive closures and properties of congruence or functionalities for deleting useless branches and bring, or contribute to, the formal proof of the smooth operating of the program.

For the program to be completely secured, it is necessary to demonstrate/show that for each transition of the graph that has been declared as "impossible" the transition can never be taken in the execution of the program, whatever the execution conditions. Analyzing routes leading to the "impossible" transition at stake can typically be a way of proving this. If other, more classic local properties, such as invariants, are used, they should naturally be proven too.

When a first program has already been secured or proven, if the program to secure may be modified by constant semantic transformations such as to reproduce the structure of the first program, then the proof of the first program is propagated to the program to be secured. This can be particularly used in the aforementioned recognition software. Besides, and more generally, it is not essential that two programs be equivalent in order to use one for the proof of the other. In an embodiment, looser properties can be used for this purpose.

In order to better understand the operating of embodiments of the computer software and embodiments of the implementing method, examples will now be used.

1. Introduction of a Descriptive Language

In an embodiment, in order to facilitate the comprehension, an algorithm description language called SM will be introduced. It makes it possible to easily express the different elements implemented by the embodiments. However, it is worth noting that any computer language can also serve as a basis for the implementation of the invention.

The embodiments described hereinafter, although they will be mainly illustrated with the SM language, are intended for programs written in very diverse languages or formalisms, whether it be for example implementation languages, logic or specification languages, graphic languages. It is simply supposed that this language can be provided with semantics under certain conditions, for example operational semantics when the program is executable, but this language can also typically also have logic traits, for example universal or existential quantifiers. As it happens, it is the case for SM language, however, its aspects are neither introduced nor used here. Here, it will be simply and generally supposed that formal descriptions (language or formalism) can be transformed into an annotated graph such as described hereinafter (paragraph 2.1) and potentially exhibiting "forks" and "joins" making it possible to describe the parallelism and/or the concurrency. For the sake of simplicity, the combination with logic quantifiers will not be illustrated here and SM synchronization and parallelism primitives will not be introduced.

As an example, the subset of the SM language is illustrated here using a few primitives of a FIFO queue, which is called "seq".

Let us first of all consider the program "member" defined in this sequence:

```
public member(elt x, seq e)
program -> [false]
 [true:false, found :true]
{
1 :     f :=e ;
        while
        {
2 :         [empty :exit]removeFirst(y+,f,f+) ;
3 :         [true:found,false :true](x=y) ;
        }
}
```

The program "member" searches for a value element "x" in sequence "e" and returns "true" if it finds the element and "false" in the opposite case. The program "member" starts by placing the value of "e" in variable "f", then scans "f" using a loop in the search for the first element having the sought value.

1.1. Exit Cases

In an embodiment, the program normally terminates by the exit "true", which is by convention the main case, if the element is found, and by the particular exit "false" in the opposite case. All programs have an implicit "true" exit, and can in addition (and it is a particularity of the language) comprise as many particular exit cases as is necessary. These exit cases can take the name one wishes. The case called "error" is restricted for describing the presumed impossibility of an exit or a branching as will be seen hereinafter. The exit cases list (other than "true" which is implicit) are listed in the program signature. Here, the list only includes one element, "false".

The program "member" thus comprises a finite number of program points (here the points called/labelled 1, 2 and 3 also no real syntax is introduced in this document for such naming/labeling of program points).

1.2. Axiomatization of Implicit Programs

In an embodiment, in order to parse the sequence, the program "member" uses "removeFirst" which removes the first element of the sequence to return to the variable "y" and the resulting sequence in the variable "f". "removeFirst" is also a program (or predicate) and it has been used in the definition of another program "member". In an embodiment, it is defined as:

```
public removeFirst(elt x+, seq e, seq f+)
implicit program -> [empty]
```

The key word «implicit» indicates that the definition of the program is implicit (axiomatic in a certain manner), and hence does not contain an explicit body such as the previous program «member». By default a program is explicit and contains a body.

This program hence distinguishes between two cases, the implicit case "true" and considered to be the main case, and the particular case "empty". Intuitively when the sequence is empty, and that no element can be removed from the sequence, the "removeFirst" call leads to the case and hence to the exit "empty".

1.3. Entry and Exit Variables

In an embodiment, the "removeFirst" program has an entry value placed/associated with variable "e", and two exit variables "x" and "f", identified by the following "+". As is standard, and unless otherwise indicated (not presented here) the exit variables are only assigned and significant in the main case "true". Hence, as a rule in the case "empty" neither "f" nor "x" are assigned, and their values cannot be used in the rest. A later use of "f" will implicitly use the entry value which will not have been modified. An attempt to use "y" (for example in loop exit) will be analyzed by the support tool as illegal as in certain routes, in this instance in a loop exit case in the first entry, the value of "y" will not have been bound.

The program is by default deterministic and sequential (if it was non-deterministic, or if its execution model comprised, for example, possibilities of back tracking or parallel execution with or without communication primitive, it would be specified with key words or additional annotations, or even written if necessary by means of a specific execution machine.

1.4. Renaming Exit Cases

In an embodiment, the part between brackets before the predicate "removeFirst" in its usage in the program "member" is a renaming descriptor (in this instance [empty:exit] which makes it possible to describe how case labels are renamed and hence in fine how the different cases are "branched". Such a renaming descriptor can appear in front of a program call, as well as practically in front of any encompassing syntactic structure, and in particular in front of a program block. In this example, there are two others, one in front of the main block ([true:false; found:true]), and [true:found] in front of the equality (x=y).

By default "true" is branched to the following instruction, or more generally is branched so as to allow the "normal" flow provided by the syntactic context: at the end of the loop "while" the "normal" flow is to return at the start of a loop, at the end of the program the "normal" flow is to terminate the program in the "normal" case, that is to say, the case "true". A loop "while" terminates by building when the case "exit" is raised during the execution of the inside loop. It is thus renamed "true". Hence, in a certain manner, the part between brackets (when it is mentioned explicitly) describes the manner in which the cases should be renamed in order to deduce the branchings to be carried out. Here, in the case of a "removeFirst" exiting on the case "empty", the latter having been renamed "exit", the corresponding transition, that is to say, the case "empty" of "removeFirst", branches the flow of the program right after the loop. This loop being at the end of the program, the program terminates in this case by a case "true" itself renamed "false". This intuitively corresponds to the case where the sought element has not been found. In the opposite case, one is in the case "true" (that is to say the equality located in 3, responds "true", renamed "found", itself renamed "true").

Typically "f:=e" is syntactic sugar for describing "equals (e,f+);" with:
  public equals(seq a, seq b+)
  implicit program
  Likewise «x=y» is syntactic sugar for ¢equals (x,y)» with:
  public equals(elt a, elt b)
  implicit program->[false]
In the first case the program «equals» associates to «f» a value equal to the value of «e» (in fact a congruence undefined here), and in the second case, it checks whether the two values (from "a" and from "b") are equal.

Hence the renaming of exit cases of a program (or sub-program) is the main manner provided in SM to allow the user to describe the branching between program points, according to the cases taken.

1.5. Logic Traces

Generally, the SM language uses Prolog like variables. If any route is taken in the program (route taken by the program in the flow of execution), by adding the logic annotations associated to the transitions (and potentially to the states) one will obtain what is called "logic execution trace". Typically, new variable names will be generated by using a new variable name each time a "+" is encountered during the execution of the program, so as not to have any naming conflicts between the variables encountered several times and modified during the path. For example, in an embodiment, the logic trace "equals(e,f+); removeFirst(y+, f,f+); equals(x,y);" can be represented as the logic trace.

equals(e0,f1+);
removeFirst(y1+,f1,f2+);
equals(x0,y1);

which has the advantage of having program variables that never change value ("single assignment" variables) and which hence can be considered very naturally as logic variables. An implicit program able to have several exit cases, each case associated to a predicate (or a relationship). Here they are implicitly the cases "true" of the programs "removeFirst" and "equals" which are supposed to have been used in the examples. Generally, each return case of a program corresponds to a predicate (or logic expression, or relationship) that will be named here by convention by combining the program name with the exit case, thus, the sequence of predicates corresponding to the previous logic trace will be:

[true] equals(e0,f1+) ;
[true] removeFirst(y1+,f1,f2+) ;
[true] equals(x0,y1) ;

In an embodiment, this logic trace can also be represented by notation (n) [true]equals(e0,f1+)->(1) [true]removeFirst (y1+,f1,f2+)->(m)[true]equals(x0,y1)->(o), where "n", "l", "m", and "o", are program point labels, with the last one, i.e. "o" being potentially an exit label. For conciseness, the logic trace can be indentified whenever appropriate by omitting some or all of the predicate and parameters names, such as in (n) [true]->(1) [true]->(m) [true]->(o).

Whenever (n) designates an (or the) entry point of the program, the present trace describing a route from the entry of the program to any point in the program is called prefix. In the case when it is important to know if the trace is traversing (going from a start point to an exit point, the term "complete trace" will be used). Thus, each command/program can be associated with a set of predicates potentially of different arities, a predicate being associated to each case, except the case "error". In an embodiment, another example of trace can be:

[true] equals(e0,f1+);
[empty] removeFirst(f1);

Typically, then « [empty] removeFirst(-,f1,-); » is none other than « [true] empty(f1)» where "empty" is the predicate/program, with two cases, « true» and « false» :

public empty (seq e)
implicit program -> [false]

Of course, each logic trace (complete or not), and each prefix will generally correspond to a generally infinite set of execution traces. These execution traces will correspond to instancing of logic traces with domain values satisfying the logic constraints. Complete traces can be considered according to the need as in the two previous examples (complete traversal of the program) or corresponding prefixes which model the execution of the program from its beginning (activation) until any point where the program is not necessarily terminated. In the SM language, the two are considered (the second particularly make it possible to describe the semantics of the programs which do not terminate, for example servers, and the programs whereof the execution model can include backtracking without however using infinite traces). However, this has no relevance for the embodiments described here. Likewise, infinite traces can be for example considered, in embodiments.

When a finite logic trace is used, it is quite easy to associate a logic expression to that trace: this logic expression is obtained as the conjunction of predicates encountered along the trace that specifies the constraints that must be respected by the values of the variables during the execution. For example, along the trace:

[true] equals(e0,f1+) ;
[true] removeFirst(y1+,f1,f2+) ;
[true] equals(x0,y1) ;

The conjunction is: « [true] equals(e0,f1)∧[true] removeFirst(y1,f1,f2)∧[true] equals(x0,y1)». Here, the symbols «+» are unnecessary provided that the semantics of a case does not depend on the usage of entry or exit variables: the case « [true] equals(e0,f1+)» generates a value "f1" which satisfies by definition the predicate "[true] equals(e0,f1)», where the second command is an equality test on two values provided in entry. This convention is not necessary, but allows for the simplification of the presentation and will be used in the rest.

Furthermore, it is noted that the predicates associated to each case characterize the evolution relationships between the program points, which they link. Thus, for example starting from point 2 of the program "member" there are two possible evolutions materialized through the two cases "true" and "empty" of the command/program "removeFirst". The first characterized by the relationship associated to the predicate « [true] removeFirst(y1+,f1,f2+)» (that is to say, the relationship that associates a sequence "f1" to the pair constituted of the first element "y1" of "f1" and the sequence "f2" constituted of elements «f1» following « 1 » in «f1») and leading from point 2 to point 3, the second « [empty] removeFirst(_,f1,f2+)», (that is to say, the relationship that associates an empty sequence "f1" to empty sequence "f2") leading from point 2 to the "false" exit (or to the point towards which this exit is branched in the case of a use of "member" in another program).

In embodiments, the use of a logic trace is a manner of using the tree structure of the program. The logic traces although, defined here in the context of the SM language, can be transposed and defined formally in more general languages, typically by induction.

Logic trace (or prefix) is also a specific case of program, a program without loop and with mono branching, according to embodiments. This is to be considered as such throughout the document. Of course when considering some logic traces of embodiments of a given program, it is not necessary for the tool to reformat and implement them as standard program.

1.6. Preconditions and Invariants

Let us now consider an embodiment of the program "remove", the purpose of which is to remove one and one instance only of "x" in sequence "f":

```
public remove (elt x,seq e, seq f+)
pre member(x,e) ;
program
{
    empty(f+) ;
    invariant member(x,e) ;
    g :=e ;
    while
    invariant member(x,g) ;
    {
        [empty :error]removeFirst(y+,g,g+) ;
        [true :exit,false :true] (x=y) ;
        addLast(y,f,f+) ;
    }
    while
    {
        [empty :exit]removeFirst(y+,g,g+) ;
        addLast(y,f,f+) ;
    }
}
public empty(seq e+)
implicit program
public addLast(elt x, seq e, seq f+)
implicit program
```

This example illustrates first of all the preconditions. Here, this program does not describe an applicative relationship (that is to say, that the function which associates "f" to "x" and "e" is not a total function). In order to remove one and only one value element "x" the program "remove" needs to be applied to a sequence which contains at least an element having this value. This example also illustrates the use of an invariant, a first program invariant (useless here), then a loop invariant which must be true at each passage in the loop. Invariants in the SM language can be programs in all their complexity. They can, in particular, introduce and modify specific variables of the invariant as well as use the variables of the program. An invariant is "true" if its evaluation returns the label "true".

1.7. Impossible Transitions

At last, the particular branching towards "error" is introduced. This label is used to describe impossible branchings (and, hence transitions). For example, in the embodiment of "remove", above, such a label is used at a place where it is known that the set cannot be empty, and that it is always possible to extract the first element (the "empty" case of the first "removeFirst is impossible). When it is used in a program, such as in the aforementioned "remove" example, it signifies the need to express and hence proves that the transition is impossible. Here, intuitively, the branching is impossible as "g" contains at least an element of value "x" as expressed by the loop invariant and hence, cannot be empty. Further on it will be seen that programs can also be used to axiomatize a property that is considered to be true by hypothesis. When the branching "error" is used in such a program used as axiom, it means that the branching is supposed to be impossible.

1.8. Axioms, Lemmas, Theorems

An SM expression provided with such constraints (impossible transitions, preconditions) thus expresses properties. In this regard, it can be considered according to the case as a "theorem", in this case a program to prove, a "lemma", that is to say an intermediary program which will have to be proven and then can actually be used for the proof of another program, or finally as an "axiom", that is to say a program that is supposed true, and which will allow for example to axiomatically define the respective behaviors of the programs whereof certain are implicitly defined. In the following section, the usage of programs as axioms are illustrated.

The use of label "error" in the axioms is illustrated in an embodiment here, in this case for the definition of the two following axioms which allow for the axiomatization of the three implicit programs, "removeFirst", "addLast" and of the first version of "empty" (that of signature "empty(elt x+)":

```
program // axiom (1)
{
1 :     empty(e+) ;
2 :     [true:error]removeFirst(x+,e,e+) ;
}
program //axiom (2)
{
1 :     addLast(x,e,f+) ;
        while
        {
2 :         [empty :exit]removeFirst(y+,e,e+) ;
3 :         [empty :error]removeFirst(z+,f,f+) ;
4 :         [false:error](y=z) ;
        }
5 :     [empty :error]removeFirst(z+,f,f+) ;
6 :     [false:error](x=z) ;
7 :     [true:error,empty :true]removeFirst(z+,f,f+) ;
}
```

Here intuitively, for example in the first axiom the branching is impossible as "e" contains an element, the one that has just been added. The first axiom can be written in an equivalent manner:

empty(e+);  =>[true:false,empty:true]removeFirst(x+,e,f+);

This allows us to partially introduce the construct « => » of the SM language. The construct makes it possible to limit the context in which an instruction is executed. If the premise terminates normally, that is to say with "true", then the first instruction of the conclusion is branched on, then the conclusion is "executed" normally. If it is negative the conclusions are not executed. This can occur in the case where the premises return the case «false», «error» or any other label. In the first case by convention, the implication returns "true", in the two other cases the label is returned without renaming.

1.9. Programs as Theorems

Typically, one may then want to deduce axioms from the two following theorem programs (that is to say, the two following programs, according to an embodiment)
//Theorems
Theorem1: addLast(x,e,f+);  =>member(x,f);
Theorem2: member(x,e); addLast(y,e,f+);  =>member(x, f);

2.0 Partial Functions Versus Total Functions

In embodiments, the SM language makes it possible to choose, to use commands or programs which are total or partial functions. The first definition of "remove" above is a partial function, thanks to the usage of a precondition. However, a total function can be used without losing the separation in an exit case required by the user, as in the following new definition, according to an embodiment:

```
public remove (elt x,seq e, seq f+) ->[notin]
program
{
    empty(f+);
    g :=e ;
    while
    {
        [empty :notin]removeFirst(y+,g,g+) ;
        [true :exit,false :true] (x=y) ;
        addLast(y,f,f+) ;
    }
    while
    {
        [empty :exit]removeFirst(y+,g,g+) ;
        addLast(y,f,f+) ;
    }
}
public remove (elt x,seq e, seq f+)
program
{
empty(f+) ;
    g :=e ;
    while
    {
        [empty :exit]removeFirst(y+,g,g+) ;
        [true :exit,false :true] (x=y) ;
        addLast(y,f,f+) ;
    }
    while
    {
        [empty :exit]removeFirst(y+,g,g+) ;
        addLast(y,f,f+) ;
    }
}
```

This second definition adds a case to the first to make it total. The third adds a processing, which makes the function total, but by changing its semantics. This third program removes the first instance of the element having a given value, if it exists, and otherwise it simply copies the sequence.

In an embodiment, a similar example with the classic case of the division would be:

```
public divideBy(x,y,z+)
pre nonZero(y)
implicit program
public divideBy(x,y,z+) ->[zero]
implicit program
public divideBy(x,y,z+) // deterministic or
undeterministic value to be defined for y=0
implicit program
```

1.10. Intermediary Representation

In embodiments, the SM language can be rather easily and naturally converted into an internal representation, here called SMIL, which represents a finite graph composed of a finite set of states/nodes (program points in SM, whereof certain ones can be entries or exits of the program), and a finite set of oriented arcs linking some of these nodes. This SMIL representation is then a manner of describing more directly the evolution relationships between program points. Each node represents a program point and is associated to a finite set of variables (that is to say variable names). Each program arc represents a case that can be labeled with a proposition on the node variables (for the node label) or a proposition connecting the variables of the two nodes linked by the program arc. For example, in an embodiment of the first defined program, ("member"), a node can be associated by command or called sub-program (it is the point preceding the predicate call, then the two exit points, one corresponding to the exit "true" and the other corresponding to the exit "false"). If one now looks at, for example, an embodiment of the node corresponding to the call of the command "removeFirst" (that is to say, the point placed just before the call), it is typically the entry point of the loop and looping (the end of the loop will reloop on this point). Starting from this point are two arcs. One corresponds to the case "true" of the command and will point to the following point (that is to say the point preceding the call of the equality test). This arc will be labeled by the predicate "[true] removeFirst (y+,f,f+)" where "f" represents by convention the variable "f" of the start state (of the point/node) of the program arc, and "f+", and "y+" represent by convention the variables "f" and "y" of the destination state of the program arc. The other program arc is that corresponding to the case "empty" of the command and points towards the exit "false" of the program "member" (corresponds to case "false" of the program being defined). This program arc is labeled by the predicate « [empty] removeFirst(–,f,–)» which is found to be by definition equivalent to "empty(f)". In this example, only the arcs are annotated. Simple invariants (that is to say classic, Floyd) would correspond to predicates associated to nodes. In the case of SM language even if simple invariants are allowed, here program invariants are used, represented by bits of programs (sub-graphs) rather than the properties of the nodes.

Although it is not strictly necessary to generate or use such an intermediary language for the inventions presented hereinafter, embodiments provide a very convenient manner for implementing them.

As for the variables associated to the nodes in the graph, they are typically determined automatically in the case of SM by analyzing the program based on the variables provided in parameters and by a fixed point mechanism (variable "intensity" analysis). This analysis can identify certain incoherencies, which must be corrected in the definition of the program, for example, that a variable is used while it has not been initialized in certain routes that can lead to a considered point.

Furthermore, more generally, other forms of annotations or arcs (or even nodes) can be considered for example sets, relationships and these could be represented by intension or extension.

2. Embodiments of the Invention

The characteristics of SM language obviously facilitate the implementation of the claims.

2.1. Parallel Programming

The embodiments introduced hereinafter although presented on sequential and deterministic programs, are more general, and are also applied to highly diverse execution models, particularly parallel, concurrent programs, non-deterministic programs or subjected to "back-tracking" possibilities. At the intermediary language SMIL some of these possibilities can be easily presented by introducing "fork" and "join" mechanisms in the graph. Based on a node, there are always several possible cases, but each possibility instead of being a simple program arc can be a finite set of arcs (a fork). Likewise, instead of only having one finite set of arcs able to reach a point, one can have a set of possibilities, each being a simple program arc or a finite set of arcs, a "join", thus leading to a structured program arc. A path in the graph being no longer simply a route (that is to say, a total order of states which succeed each other in time), but a partial order, that is to say the execution traces, but also the corresponding logic traces, becoming as is generally known partial orders. Furthermore, the program arc annotations become more complex. Rather than apply to a simple program arc, they apply to more complex configurations between the nodes before and after corresponding to a case. However, as before, these properties can be expressed on neighboring nodes (in the partial order). Each route or sub-route in the graph generally corresponds, not to a total labeled order of nodes whereof the nodes and arcs are annotated by predicates, but similarly labeled partial orders. In this instance, it makes it possible in this instance to support highly diverse synchronization mechanisms at the SM language level, the only constraint being to know how to transform the description into a SMIL graph. Typically, a synchronization will be translated as a "join" followed by a "fork" joining then releasing the programs that are synchronized (two or several). For the sake of simplicity, SM synchronization and parallelism primitives are not introduced. Furthermore when in the rare cases where such primitives will have to be used in this document, it will be done at the SMIL intermediary representation, where solely primitives "fork" and "join" allow for a sufficient expressiveness. Hence, at this stage the notion of program can be generalized. A program will thus be defined as a finite set of points linked by a finite set of transitions, provided with one or several entries (only the single entry case is illustrated) and one or several exits. The points can be annotated with logic properties characterizing the states associated to the point, the transitions can also be associated to logic properties describing the relationship linking the states corresponding to the points it connects. When the program describes a sequential program this last relationship describes how a state of the start point is linked to the state corresponding to the end point. When the program describes a parallel program, with or without synchronization, the states are typically tuples describing the state of the process being executed in parallel, and the relationships describe the partial order that links the tuple from the start point of the transition towards the tuple of the end point of the transition. But the program points can alternatively be considered to be the local points in which cases some transitions will be linked (in the case of "fork" or "join" the forked branches or the joining branches are linked). The convention taken here has an impact on the evolution rules themselves, and the tree structure derived from the program, but not on the applicability of claims.

2.2. Scission/Branching

Thus, by providing the information technology means, using characteristics of the description language (programming or specification language) and equipment (that is to say, "computer software") which supports it, assists the user of the environment to split a command, or a referenced program (that is to say a program that is called based on another one) into a finite number of cases, each corresponding to a processing case. These different cases can each lead to a different branching including potentially the branching to "error" (which of course does not exclude that all or part of the cases lead to, that is to say are branched, towards the same point), particularly in a manner to (a) reduce or delimit the "scope" of a command or sub-program in one or several of its usages, or (b) be able to identify and utilize the combinatorics or successions of impossible cases. For example, by way of illustration of (a), it is worth noting that at line 2 of the axiom (2) it is considered that a restricted instruction, which always removes the first element, is used. This operation can only be applied to a sequence containing at least one element. This program hence infers a local constraint at point 3. Furthermore, by way of illustration of (b), it is worth noting that if logic is considered leading from the start of the program to point 3, the combinatorics of the transitions leading to this point is incompatible with the transition which would cause the branch "empty" of the following removeFirst to be taken.

In practice, according to an embodiment, one can, for example, have identified beforehand the possible cases to expect for a command or a sub-program, such that the tool assists the user in selecting or managing the choice of the cases to retain (not necessarily all which would also create in itself a constraint) and potentially the manner of associating the selected cases to the control structure of the program during usage. This is what the SM language naturally allows for. Typically the equipment will make it possible to ponder on the case breakdown, and particularly the cases to use. By way of example, here the implicit definitions of "removeFirst", and "divide" each provide two cases, and each time one of these commands is used, the corresponding branching should be implicitly or explicitly decided of, or implicitly or explicitly decide that the case is impossible or must not be used in the context of the call (which is a manner of restricting the scope of the command). The SM language and tool supporting it, verify that each branching is either achieved, or implicitly or explicitly resent to "error" which, by convention, expresses the impossibility property of the corresponding transition.

Asking these questions during the description and thus the definition of a program incidentally facilitates the program segmentation into cases during the definition for use as a program/sub-program in the definition of other programs to come. For example, the first usage of removeFirst in the second version of "remove", infers the case "notin" of the program "remove" during the definition.

2.3. Branchings/Impossible Transitions

Typically, one would potentially want to express, then prove/verify that certain transitions or prior-defined cases are impossible at certain points (in some of their usages). This is what has been carried out several times in the description of axioms as much as in the programs to be proven, by using the branching (implicit or explicit) provided for this purpose in SM language. Hence, in embodiments, it is the preferred manner used here for deciding on the cases to be used for a command or a program, and introducing constraints on transitions, however it is obviously not the only manner. Furthermore, the computer software can allow for it even when the language does not allow for it, if need be, by adding annotations and specific processing.

2.4. Capacity of Restricting the Semantics of Certain Steps

In an embodiment, considering that a program and the transitions it describes thereto, or given a specification/formal description and the transitions it describes (effect on the variables, pre/post, weakest precondition), the means are thus provided to express the possibility of restricting the semantics (that is to say, the definition domain, the processing possibilities) of certain transitions, operations, commands or programs, to reduce them to transitions which are more appropriate (as they use certain primitives or well understood or well-honed parts, or for any other reason). For example, it is the case in the previous examples for the first versions of "remove" and "divide". In many situations this technique is an alternative to the previous one (one can often use a version with a larger domain, but specific cases for the parts which extend the more restricted domain, then declare the impossibility of transitions for the additional cases, or like here use a version having a more restricted domain).

In an embodiment, by way of additional example, in an imperative program, one can, for example, decide that a use of the operation/instruction "increment of an integer" is limited to the case where it corresponds to the addition without overflow (and hence to the semantics of the increment in the usual mathematical sense). This is typically required without changing the global semantics of the program, or by providing the means to analyze the impact of the modification introduced by this local restriction. In the previous example, one can express the fact that the instruction is indeed only called under these conditions (for example, because it is preceded by a test checking that the variable is lower than a value guaranteeing it).

In embodiments, the three previously presented mechanisms are hence linked. One can particularly as one has seen do without the third one, by a combination of the two first ones. In general, this is what will be done in what follows. By way of an additional example, one can also want in a given place to use a version of the division, which rules out the case of division by zero. These last two examples can, for example, be obtained alternatively with versions of the increment operation (respectively the division operation) which distinguishes the normal case (that is to say, "true") from the "overflow" case (respectively "divisionByZero") towards "error".

Solely the association of constraints to transitions has been illustrated here. One can, of course, also associate constraints to program points. In the here-presented SM language fragment, according to embodiments, one has taken the option to only present the mechanisms which make it possible to introduce the constraints associated to the transitions, as one can always replace a single-point constraint with a transitional constraint by introducing just in front of this point a command which corresponds to this property, a command which distinguishes between two cases "true" and "false" where the case "false" is declared as being an impossible transition. The association of single-point constraints hence becomes a particular case of associating a constraint with a transition. By contrast, one can also put oneself in the case of a language where one cannot directly express constraints on the transitions (the case for current languages) and place constraints (that is to say, typically invariants to be selected from a list or combinatorics of predefined properties) in front of the call instruction such as to indirectly reduce its useful semantics, possibly structure these properties into a property disjunction each one corresponding to a case, then use the "restructuring" techniques introduced hereinafter in order to associate the thus identified cases to structural constraints (or subsequent transitions). Furthermore, it is not merely a case of placing invariants, but rather invariants associated with instructions, as well as being guided and assisted (for example by selecting from a list of possible cases or by leaving the responsibility of choice to the equipment).

2.5. Characteristics of Obtained Programs

The program obtained by means of the equipment, and particularly in the case of SM, its intermediary form can be considered as resembling a "flowchart" such as defined by Robert W. Floyd, with several features. First of all, by resuming the definitions used by Floyd, whereas the functions of interpretation, and in particular the right identification of what is generally called "loop invariant" in Floyd and in most proof approaches which followed, are essential to the proof in-itself, here it is not necessarily the case. They can be defined and be used in a traditional manner (that is to say, as in Floyd-type approaches), however, the invention introduces new original manners. Particularly, all or part of the interpretation functions or invariants provided by the user can be proven as will be seen.

Furthermore, in an embodiment of a Floyd-type approach, one has, at a given time, one single instance of what is called here "single-point constraint". This constraint is placed at the end of the program (or like a couple of pre-post conditions located at its ends) to describe the function or one of the functions that are expected of the program. The proof of this unique constraint is achieved by exhibiting a coherent interpretation function, or by providing loop invariants which make it possible for us to calculate this interpretation function (Dijkstra-type approach). Embodiments of the invention allow association of several local constraints called local properties (at several program points), typically, wherever they appear natural to the user to express (for example the equality located in the axiom loop (2)). Then, either classic techniques can be used, consisting in completing the associations (adding some invariants, also called here local properties, which in some way add redundancy) such as to obtain an interpretation function coherent with the constraint or constraints and make a proof by invariant, or use other more specific proof techniques that do not necessarily require the use of loop invariants or interpretation functions. One can, for example, use the tree structure by using the logic sub-routes leading to this point in order to characterize the properties in this point. Other specificities when one compares the method presented here with the instrumentation of more classic techniques derived from Floyd-type approaches are of course the use of constraints associated with transitions, the interdiction of certain constraints, and obviously the possibility to use thus instrumented programs as "axioms" (for example axioms (1) and 2)), as well as intermediary program ("lemma" programs in a certain manner).

In embodiments, in general, other components of a program such as its sub-graphs can be associated with local properties. A program being defined and provided with an execution model, for example deterministic or not, with or without backtracking possibility, one can use a program for describing several types of sets, that is to say, domains, including data.

As regards expressions, one generally distinguishes those used for the program description, (that is to say in a way those defining its semantics) from those used to express the (typically local) actual properties of the described program or the properties attributed to it. In the rest of the document, the term "property" is only used in this second sense. In the other use cases, there will be mention of transition semantics or point domain.

2.6. Re-Organization

In embodiments, it can be useful to modify the structure of the program in order to facilitate the verification. There are numerous reasons which can lead to not construct directly the structure that is thought to be the best adapted by using the aforementioned mechanisms. For example, for methodological reasons (one starts from a program that has not been described with a tool based on the method described here), or simply because several different views corresponding to different program structures are required (in order to address for example different verification needs). However, it can also be due to using a language different from that of SM which does not allow expression of the case breakdown of the processing, or the impossible transitions. The re-organization hence consists in transforming the structure of the program (its branching, its nodes, the annotations and cases used). Of course, the program transformation described in this section does not necessarily need to be actually achieved, but can simply be an abstract view of the program used by the equipment for its own verification needs or for user interaction.

For the sake of simplicity, the presentation is limited here to using very basic techniques for illustration purposes only. Thus, constant semantic program transformations are limited on one hand, and to only the following elementary transformations being used on the other hand:

(a) a first basic transformation, in an embodiment, is to consider one or several transitions arriving at one program point (not necessarily all transitions arriving at this point), to redirect these transitions towards a new point (a clone of the first, which will particularly have the same annotations where required) and to duplicate (clone) the transitions which originated from it (obviously, by using the same annotations for the cloned arcs). This transformation ensures semantics preservation provided that the name of the program point does not have any effect on the semantics, which is generally the case and is particularly the case for the presented SM fragment;

(b) a second elementary transformation, in an embodiment, consists in carrying out a graph cleaning operation, for example by deleting the dead branches as already seen;

(c) a third category, in an embodiment, consists in adding intermediary steps without affecting the semantics and whereof all the cases are branched at the insertion point. Of course, the possibilities depend on the adopted semantics. Typically these operations, with the semantics based on the examples from this document, should be without effect on the variables, and without preconditions or with satisfactory conditions on all values at the application point;

(d) on the contrary, in an embodiment, deletions of certain intermediary steps can be achieved, when these steps are neutral for the chosen semantics;

(e) in an embodiment, a possible specialization of certain annotations: when certain parameters of a logic annotation are known the latter can generally be simplified (for example, add(i,j,j+) can be replaced by increment(j,j+) when «i» has for value »1«, p(x)=>q(x,y) can be replaced by q(x0,y) if value x0 of x is such that p(x0)=true).

First example: return code. In a program, and particularly in a program written in a language that does not support, unlike SM, the separation into different return cases and associated branchings, or supporting this possibility with a certain cost in terms of execution (for example exception mechanisms in an execution language), a return value can be positioned which characterizes the manner in which exits a called program (for example "0" if exit is carried out normally, "−1" in another case, and just after the call to this program, be led to test the return code and based on the value "0", "−1" or any other unexpected value to be branched to different places in the program. In order to affect placement in the operating conditions of the present method, the exit point of the called program on one side can be "cloned" and then clone the points that are immediately after the called program in the calling program, and that perform the testing of the return value and corresponding branching. This is done by using the transformation (a) one or several times, that is to say, once for "−1" and potentially once for unexpected values, such as to have three kinds of points both in the called program and in the calling program each specialized in a case. Then it is noted that the state corresponding to the normal exit will always have the return code positioned at "0" and hence, following the test carried out on the return value, the same branching will always be used. Consequently, the other branchings implemented are impossible. The other points will have the same properties, that is to say, that corresponding to the return code "−1" and that corresponding to the other cases but obviously the branchings used and the branchings rendered impossible after the test will no longer be the same.

Second example, in an embodiment: Virtual machine (VM). It is supposed that a virtual machine or a language interpreter is described using a program. Typically, one will have an interpreter loop in which the instruction corresponding to the current point can be read and decoded. Consider this point located in the interpreter loop where this processing starts, and insert, just before it, an instruction which carries out itself the reading and decoding operation (typically by duplicating it), except that it will have as many exit cases as the number of possible instruction types existing in the program to be analyzed, as well as a certain number of exception cases, that is to say incorrect memory area, illegal instruction, etc.), and where all the exit cases of this intermediary instruction are branched, whereof the semantics will be such that they are without effect on the variables and without pre-condition, that is to say, total, at the insertion point. This transformation is hence of (c) type, and thus, the situation of the previous example where the other two types of transformation will be applied, such that an equivalent program which will have this time "cloned" the analysis point of the command, such that if a particular program is selected to interpret, the transformation can be pushed a bit further (by applying in a quite natural manner the set of authorized elementary transformations) until the interpreting loop has been replaced by a structure which will replace that of the program to be interpreted. This can be achieved more directly in fact in using in the first step a reading and decoding operation that has as many steps as program points of the interpreted program: each point corresponds to a particular program instruction, but the same instruction being potentially used many times in the same program, we obtain a more precise structure for the transformed interpreter which happens to be exactly that of the interpreted program. In a certain manner, a partial execution of the program will have been done, when the program to be interpreted has been transformed.

In these two examples, an equivalent program by transformation is obtained except for certain intermediary steps that can be considered as invisible. The second program thus obtained will be such that the proof of its properties will make it possible to deduce properties of the first program, and will have a richer program structure, which will allow for applying certain "static" techniques, introduced here. Knowing that the executions of one of the programs can easily be found in that of the others (considering the nature of the applied transformations), it is easy to establish certain sufficiency relationships between local properties of the programs (that of the start and that obtained after transformation), even in the case where the proper separation in cases and relevant branching has not been obtained when describing the program of interest (for example in situation where the implementation or specification language doesn't support for separation in cases). Hereinafter, the possibility of establishing sufficiency relationships will be illustrated in a more detailed manner.

3. Use of the Program Structure with its Local Constraints Associated with the Transitions for Program Verification In an embodiment, the use for verification can intervene in the expression of properties, and/or for the proof itself.

(a) Expression of properties: As for the expression of logic properties (essential in program verification) the techniques consist in considering the programs obtained with equipments exhibiting one or several of the previous characteristics (and hence with them the constraints that they express) as if they were logic properties, (i) either as a means to structure more elementary logic expressions, (ii) or as logic expressions in their own right (a program would be a logic expression in a new type of logic system, where inference rules would be replaced by more sophisticated rules intended for more complex electronic processing).

3.1. Decomposing the Program into Elementary Properties

Thus, in the axiom (1), it is decided that only the main case "removeFirst" (and hence its corresponding transition) is possible at the point where this command is invoked (that is to say after call of the first command), and that the case "empty" is impossible. This makes it possible to express a constraint/property at this point (which, here is assumed, that is to say it is an axiom, however the same program fragment can just as well be used to express a property to be proved, or an intermediary lemma). Intuitively, this constraint only expresses that when the program reaches this place whatever the state of the variables, it is impossible to take the branch "empty" (that is to say one is not in the application conditions). Secondarily, given the underlying execution model, i.e. without backtracking or deadlock, it also expresses that the remaining branches are applicable (or that this point is never reached meaning that it is a dead branch).

3.2. Link Between Local Properties of the Program and "Proof Obligation"

According to the case, the link between these properties and more classic logic formulations (that is to say, typically "proof obligations") can be made in order to call classic logic proof environments. In this case, the programs and the three mechanisms that they implement using the equipment, purpose of the invention are to be considered as a manner to structure the elementary logic properties, for the interaction with the user (but also potentially to facilitate the work of the equipment) during the proof.

First of all, bearing in mind that a route in the program leading from one point to another, by taking the branchings (not declared "impossible") in the execution flow of the program, can be associated with a logic trace which can itself be associated with a logic expression which describes the constraints that must be respected by the values taken by the program during the execution leading from the first point to the second. Considering the program point towards which such a route leads, or more generally a program point and a set of routes all leading to this point, if certain transitions starting from this point have been declared impossible, then for each impossibility there is a property of the form $\forall A \cdot P \Rightarrow \exists B \cdot Q$ where the premises P express logic properties on the route/routes leading to the point of interest and Q the relationship associated with the transition (and potentially also whenever applicable the properties associated to the start and end points of the transition). Other complementary properties can result from the execution model. With the underlying model used here (imperative model without "backtracking", or "deadlock") there is in addition a property with the form $\forall A \cdot P \Rightarrow \exists B1 \cdot Q1 \vee \ldots \vee \exists Bn \cdot Qn$ where $Q1, \ldots, Qn$ representing the relationships of branches allowed starting from the point of interest. For the axiom (1), for the second program point, that is to say, the point located between the first command empty(e+) and the second removeFirst(x+,e,e+), and the only logic trace/route that leads thereto we have:

$\forall e. [true]empty(e) \Rightarrow \exists (x,f) [true]remove(x,e,f)$

For the first and second point properties can be added expressing the progression that are due to the underlying execution model.

$\exists e. [true]empty(e)$ $\exists e. [true]empty(e) \Rightarrow [empty]remove(-,e,-)$ Thus, embodiments provide a manner of generating a set of basic properties associated with a program. Each property, being itself associated with a node and a route or set of routes leading to this node in the program graph.

3.3. "Proof Obligation" and Programs with Loops (Invariants and Implicit Invariants)

When there is a finite number of logic traces, one can implicitly or explicitly limit oneself to programs without loops. Here, three possibilities are exhibited which involve the use of loop invariants. The first two are presented in the remainder of this section, the third will be presented in a separate section.

A) In embodiments, the first is the classic use of loop invariants in the program to prove. The user proposes invariants (at least loop invariants). Typically, for a program with three branches A,B,C that can be taken in this order, with the possibility of looping on B, or skipping it (that is to say, the possible executions of the program all conform with the regular language (A(B)*C), provided with a proposed loop invariant called I, apply the invariant technique is resumed to using for example instead of the start program the programs without loops: AI, IBI, IC, where alternatively AIC, IBI depending on the approach used. As in a conventional manner, these invariant techniques are used on the target program (the theorem program, and not an axiom program), it is generally not necessary to use/exhibit invariant properties, which characterize with precision the properties of the start program at the insertion place of the invariant. It is sufficient to use a weaker property which is at the same time a satisfactory property in loop entry and preserved by the loop and sufficient for proving the properties of interest. In a certain manner, the classic use of the invariant is a direct usage of the induction, and in fact, whatever the logic trace of the first program, it is known how to associate logic traces with it from the set of associated programs. For example, to the logic trace corresponding to ABBC, it will be obvious to assign to it the traces AI, IBI, IBI, IC from the associated programs without loops; but the correspondence does not need to exist in both directions. It is possible that, instantiating traces of IBI do not correspond to any execution of the start program, as the invariant is potentially weak.

B) In embodiments, the second possibility is illustrated by means of an axiom (2) which can make it possible to generate an infinite number of routes and hence logic traces, and hence an infinity of logic properties. If such a program was a theorem rather than an axiom, one can find oneself in the previous case. When such a program is used as an axiom, which is specific to the presented method, although it is not classic, the same technique can be used under the condition to have an invariant that corresponds exactly (and not merely loosely) to the property respected by the variables at the insertion point of the invariant. However, the most important thing is the fact that it is not necessary, when using the claims, to make explicit this invariant. It is possible, and it is a feature of the method, to use an invariant of a new type which is called implicit invariant. In the example of the axiom (2), a loop invariant is used located at the start of a loop (it is more practical but not the only possibility), for example, « implicitInvariant(x,e,f)», which pertains to the variables defined at the start of the loop (which a static analysis can provide). The latter is implicitly defined by induction (by definition it is the strongest invariant which is applied at the start of the loop on the variables x, e, f). Once this implicit invariant is thus defined, the situation wherein an axiom program has been replaced by several programs without a loop (here three as there is not only one single loop in the start program) is realized.

In embodiments, these three programs are:

```
program //axiom (2a)
{
    addLast(x,e,f+) ; => implicitInvariant(x,e ,f) ;
}
program //axiom (2b)
{
    implicitInvariant(x,e,f) ;
    {
        [empty :false]removeFirst(y+,e,e+) ;
        [empty :error]removeFirst(z+,f,f+) ;
        [false:error](y=z) ;
    }
    => implicitInvariant(x,e,f) ;
}
program //axiom (2c)
{
    implicitInvariant(x,e,f) ;
    {
        [true :false,empty :true]removeFirst(y+,e,e+) ;
        // following instructions not useful
    }
    =>
    [empty :error]removeFirst(z+,f,f+) ;
    [false:error](x=z) ;
    [true:error,empty :true]removeFirst(z+,f,f+) ;
}
implicitInvariant(x,e,f) –>[false]
implicit program
```

This implicit invariant generation technique can be used for the proof of property.

In an embodiment, the properties expressed by the axiom (2), are generally not simple to express in the existing formal approaches (for example, in the present case one would have used several quantification levels to express the invariant explicitly). Here, it is enough to follow the execution of the program in order to understand which local properties apply to which flow of execution and at which step of these flows. Thus branching induces separation of flow, and allow for more local properties. Here local properties are described as transition impossibilities (or semantic or scope restrictions used). These local properties basically express here that when an element "x" is placed at the queue of a sequence "e", the sequence "f" thus obtained, if it is emptied element by element, will give exactly the same elements and in the same order as the sequence "e" if it is emptied in the same manner. That is what the loop expresses. When the latter will have been exhausted, there will be exactly one element in "f" which will happen to have the value of "x", as expressed by the part of the program located after the loop.

It is worth noting here that a program or fragment of a program (that is to say, a program sub-graph), can be seen as a manner of defining several relationships), particularly a relationship per type of exit (label). Obviously, it is possible to consider the unique global relationship formed by the union of all these relationships, however, it is not the option that is taken here. Thus, let it be considered that for example the following program fragment extract of the axiom 2 (this program fragment corresponds well to a SMIL sub-graph, from the graph of the axiom 2),

```
{
2 :     [empty :exit]removeFirst(y+,e,e+) ;
3 :     [empty :other1]removeFirst(z+,f,f+) ;
4 :     [false:other2](y=z) ;
}
``` naturally defines several relationships, the relationship which corresponds to the exit "true" of this program fragment (in the context of the axiom 2, it is the case of the loop path), that which corresponds to the exit "exit" (exit of the loop in the context of the axiom 2), as well as those corresponding to cases "other1" and "other2" which in the context of the axiom 2 are stated to be impossible (in this instance empty, since pertaining to relationships). F will be the name of the first of these relationships in the sequence. F will thus be the relationship corresponding to one execution of the loop in program Axiom2. Then, E will be the name of the relationship corresponding to the normal exit (that is to say "true") of another program fragment, the latter leading to the entry of the program Axiom2 at point 2 (without any looping on this point)·E is thus the relationship corresponding to the program fragment preceding the entry into the loop for the program Axiom2.

Now, if one takes an interest in (a) on the one hand the more complex program fragment P1 of the axiom (2), which uses the same entries as the axiom (2) but exits on the transition leading from the program point 2 to point 5 (that is to say, corresponding to the case "empty" of the instruction associated with point 2, that is to say, the exit of the loop), (b) on the other hand, in fragment P2 which enters in the axiom program (2) at point 5 of the axiom and uses the same exits as the axiom, one has two program fragments which play different roles with respect to point 2 of the program Axiom2. The first program fragment is of course a combination of the two previously identified program fragments, which correspond to the relationship E and F. As the programs described here assume an execution model without backtracking, this first program, P1 expresses in a certain manner the properties which characterize the values of the states at point 2, of the program Axiom2, whereas the second P2 expresses the properties which should verify these states, at point 2, given the rest of the program. If the relationships corresponding to the main "true" exits of these two programs are respectively called FP1 and FP2 (that is to say, the only ones considered here), these relationships respect the following property: rng(FP1)⊆dom(FP2).

Hence, when placed in a program point, here the point 2 in the program Axiom2, the program fragment which leads to this point without ever going back to it again (in this instance in the present case the point 2 is in a loop and the program P1 responds to this constraint), makes it in particularly possibly to specify the domain of values that can be taken by the program Axiom2 in this point, here the point 2 (i.e. rng(FP1)), while the program P2 makes it possible to specify the domain, at this same point, making it possible to satisfy all the operations coming after this step in the execution. The different operations used in these programs here, being deterministic, the different relationships are functional (but not necessarily total), particularly relationships E, F and FP1. It is easily shown that FP1=E∘(F⁰∪ ... ∪F^i ... )∘G where F⁰ is the identity and F^i is the composite of i application of the function F, and G is a restriction of the identity function in case the sequence e is empty. Thus, it is easily shown that FP1 can be obtained as a fixed point equation, in this instance those implicitly defined by axiom (2a) and axiom (2b) (the strongest property satisfying this definition exists and is rng(FP1)). The third implicit axiom, axiom (2c) itself representing the properties expressed by the property rng(FP1) $\subseteq$ dom(FP2).

It is to be noted here that an implicit invariant has been defined in a case where the automatic generation of an explicit invariant would not have been possible due to the presence of a loop.

3.4. Invariant Programs

In embodiments, in the SM language, even if it is possible to use classic invariants (that is to say properties at program points), it is also possible to use real program bits, handling in addition to the program variables, potentially their own invariant variables. Instead of making explicit the invariant property which is applied to a program point, an invariant program is used (bit of a program) which does not modify the current state but can modify its own invariant variables. This invariant program implicitly characterizes the state to which it is applied (that is to say, its entry parameters) by describing the behavior that such an invariant program would have when triggered at this place. Of course one can use as many invariant programs as required (and potentially put one in each program point). These invariant programs can also share some of their invariant variables (the initial value of an invariant variable is that left by the invariant program which has preceded it). These invariant programs can be seen as symbolic tests and make it possible to indirectly/implicitly express local properties.

Typically, in embodiments, static techniques will be used so as to make sure that the invariant programs do not modify the behavior of the programs on which they are placed, as well as to show the initialization and typing properties of the invariant variables. If one decides to use traditional verification techniques based on invariant techniques, these program invariants typically are reduced to "proof obligations".

Here too, the program with program invariant can be considered as a second program which only needs to be proven in order to prove the first (that is to say, prove its properties). The use of program invariants is thus an illustration of a use of a second program, i.e. the program with invariant, having different functionalities from the first program, and/or not merely being an abstraction of the first program, as a way of the securing the first program. It can also be considered as an illustration of setting sufficiency relationships between the two programs, but we will not develop this here as dedicated illustrations are proposed thereafter. The program invariant is also a manner of using program fragments, that is to say, the invariant programs in order to implicitly describe invariant properties which would have alternatively been explicitly expressed in these points.

4. Proof

In embodiments, the general approach is mainly about operating the structure of logic programs (program points, transitions and associated constraints) by using program analyzing techniques, automaton theory or program transformation, in order to achieve or simplify verification, by potentially combining them with traditional proof techniques. However, the structure of the programs can also be used such as to structure the proof and present its progression and to interact with the user. Finally, a last operating possibility which will be introduced is the correlation of local properties of one or several programs to propagate certain proof results, particularly certain transition impossibility proofs.

4.1. Interaction with the User

In an embodiment, when one reaches a program point during execution of a program (hence having taken a route in this program), none of the program transitions starting from this point and declared impossible should be able to be executed and this must be able to be proved. Furthermore, if the execution model is without backtracking, one at least of the transitions allowing us to start from this point amongst those declared impossible (the program points and cul-de-sac transitions are removed after the declaration of impossibility of using the branches leading thereto, and so forth: it is a program analyzing technique that is applied in order to simplify the program and put it in a normal form) is "firable", and this should also be able to be proven. Hence, it the proof can be structure in this manner: the tool attempts to prove the impossible transitions in each route, and identify when it fails (and each time that it is possible) the route/routes (they are prefixes of routes in practice) which prevent it from proving the impossibility of a transition (the set of identified routes able to be represented by a sub-graph/fragment of programs, particularly in the case if infinite sets). The user can thus analyze and get an idea about the route/routes which lead to impossible transitions which the environment cannot demonstrate. This can enable him to get a better idea about the problem (property that is actually false and unable to be demonstrated, or indication to give to the environment in order to resume the proof).

4.2. Structural Transformation of the Program

Bearing in mind that when the method is used, the verification itself is based on the program structure and the constraints associated with it, it is generally possible to carry out all or part of the verification by transforming the program until leading to a form that can be automatically or easily proven. In an embodiment, it consists in transforming a program (which according to points of view is either a logic property in a high-level logic, or the manner of structuring the most basic and conventional logic properties) into another equivalent program which will either have exactly the same semantics or semantics such that the proof of certain local properties of the second make it possible to deduce that of other local properties of the first. It will be said that a local property of the first is in a sufficiency relationship with certain others of the second, if the proof of the set of the latter makes it possible to deduce the proof of the first. In this instance, for illustration needs, the particular case of equivalent programs will be taken. Two programs will be considered as being equivalent if they have the same real traces, (one simply deletes the logic traces or sub-logic traces that do not have a solution and hence no possible instantiations, and hence no corresponding execution traces), except for potentially certain steps considered as invisible. Each transformation can thus be considered as a proof step. Of course, it is not necessary to have equivalent programs, in order to establish and operate "sufficiency" relationships between local properties themselves, the case where the two programs are equivalent being a particular case. For the sake of simplicity, the notion will be introduced through several examples of equivalent programs, according to embodiments.

In these examples, for the sake of simplicity, constant semantic transformations are used. More generally, what is important is that such a transformation makes it possible to establish one or more sufficiency properties, that is to say the proof that a local property of a program can be established if there is proof of the properties in correspondence in another program.

Two examples are taken, the unfolding of a definition and the deletion of dead branches. If one considers Theorem1 it is possible to unfold "member" by its definition (by the body of its definition) on condition to manage the conflicts of names of the variables if need be, for example by using fresh names of variables for the variables of the body of the unfolded program. In this instance, the following program Theorem1Unfold would be obtained:

```
Program Theorem1Unfold
1 : addLast(x,e,f+) ; // we can leave => here
[true:error,found :true] //and use [true:false,found :true] instead.
{ // the internal representation (the annotated graph is the same in all cases
2 :         g :=f ; // g is a new variable to prevent a collision
            while
            {
2.9 :   //loop
3 :              [empty :error]removeFirst(y+,g,g+) ;
4 :              [true:found,false :true](x=y) ;
            }
}
```

The two programs thus correspond in both senses, and here in a reversible manner as the transformation is an equivalence. Certain transitions/arcs (or sub-graphs) can be put in correspondence in the two programs. For example, the forbidden transition of 2 towards "error" and labeled by «[false]member(x,f)» that corresponds to «[empty]removeFirst(y+,f,f+)» in both senses (i.e. two symmetric directed correspondences). If one is proven impossible, the other can also be considered as proven. For example, if the impossible transition of the first program is considered, it has a sufficiency relationship with the second transition. In order to prove its impossibility, all that needs to be proven is the impossibility of the second one (that of the second program). More generally, there could be a set of transitions associated with one transition by sufficiency relationship (that is to say, to prove the impossibility it would be sufficient to prove that the sets of transitions in correspondence is impossible). More generally, the correspondence can also be obtained between sub-graphs. Here, the transition of the first program also corresponds to the sub-graph going from the point preceding the entry in the loop (here, the point is not materialized but could be called 2.1. Intermediary points can always be added, just as if one had added in the program, the instruction, «nop( )» which has no effect on the variables and which is invisible) and the exit of the loop (that is to say, (i.e. «[empty]removeFirst(y+,f,f+)»). Likewise, the proof of impossibility of the transition of the first program (which signifies that no instance of this transition is possible at this place in the program) is equivalent upon proof of inexistence of an execution trace instance taking this sub-graph at this place (of course what is meant here is the existence of a route crossing the sub-graph from end to end). There is also mention of the impossibility of a sub-graph, or the fact that it is dead, which does not mean that all its transitions or points are dead (in this instance there are other possible exits from the loop, on «[true](x=y)», which are actually possible. For a sub-graph, the impossibility is equivalent due to the fact that all logic traces crossing the sub-graph right through without solution (typically the logic expressions corresponding to them all are without a solution, that is to say, they all make it possible to infer "false", or due to the fact that there is no logic trace (no route leading from the start until the end of the sub-graph).

It can be observed that the impossible transition is a particular case of an impossible or dead sub-graph. When a sub-graph is impossible or dead, and proven as such, the dead branches can generally be cut (here in this instance the transition «[empty]removeFirst(y+,f,f+)»).

4.3. Proof by Association or Composition of Two Programs

In an embodiment, it is supposed that one wants to prove the theorem (1) by using the axiom (2). The theorem (1) will be unfolded in order to obtain Theorem1Unfold as previously described. It is thus decided to use the loop invariant ∃e. [true]implicitInvariant(x,e,g), where the invariant is that obtained based on the axiom (2) as previously described, and it will be placed at the start of (the only) loop of Theorem1Unfold, for example, at point (2.9). Two "proof obligations" are obtained, one expressing that the invariant is satisfied during the entry into the loop, and the other expressing the conservation of the invariant. The routes can be transformed into "proof obligations" and go through classic logic proofs. But, in embodiments, it is also possible to instantiate some program, or some program fragment and/or compose it with theorem (2) to directly prove the theorem, without going through the use of "proof obligation". This is what is illustrated below.

Now, one needs to prove that "member" is true (that is to say that the case true is the only possibility at this place), and for this one can show the impossibility of the branch exiting by "false". In the Theorem1Unfold one can identify two impossible branches, one linked to the non-satisfaction of the invariant, the other being the "empty" branch at point 3. There are two routes leading to first impossible transition. Amongst these two routes, one begins from the start of the program and leads to the loop invariant that is to say, (1)[true]->(2)[true]->(2.9)[false]->(error).

The other leads from the start of the loop, the invariant satisfying a situation after having executed once the loop where the invariant is not anymore, that is to say, (2.9)[true]->(3)[true]->(4)[true]->
(2.9) [false]->(error), There is one route leading to the second impossible transition (i.e. the route leading from the start of the loop to a case where "g" is empty"), that is to say, (2.9) [true]->(3) [false]->(error).

Looking at the first of the three logic traces above, consider the values of "x", and "e" at program point 1, and "inject" them in axiom (2a), this gives a value for "f" and the fact that implicitInvariant(x,e,f) is true, or more precisely that a branch of the form "[false] implicitInvariant(x,e,f)->(n)" is impossible. Deduction from the functionality property of "addLast" can be done, and from the fact that the value of "g" and "f" at point 2.9 in the logic trace (i.e. on the first entry into the loop). From this the impossibility of the route can be deduced from the functionality of "implicitInvariant", which is what is wanted. So, here instantiating (injecting value) values of a program (i.e. here axiom (2a)), with values from the program to prove, i.e. the first logic trace, to demonstrate the latter is done. The exact rules that such "program matching" was to satisfy were not described. In an embodiment, the technique of applying the "transitive congruence closure" combined with the use of program invariant presented previously is a straightforward way of achieving this program matching, i.e. that is of using another program with some variables instantiated from values of the target program in the process of proving the target program. It can be used that the program used here is not merely an abstraction of the target program. The same techniques can be used for proving the impossibility of the second logic trace using (i.e. matching) axiom (2b), and proving the impossibility of the third trace using axiom (2c).

4.4. Transitive Congruence Closure

In an embodiment, on each logic trace, or on each approximate trace (how to obtain it is shown in the following section), it is possible to apply a transitive closure technique of the equalities or more generally congruences on the values taken by the variables, hence, on the logic variables. The congruences come either directly from the semantics of transitions (a transition which comprises or implies certain equalities between variables), or from the deterministic properties of certain commands (a deterministic transition/function applied twice on the same parameters or on congruent parameters give exit values that are respectively equal or congruent. By way of example, first consider the new version of Theorem1Unfold where some new program invariants have been added:

```
Program Theorem1UnfoldwithInv
1 : addLast(x,e,f+) ;
1.1:            invariant
                addLast(x,e,f+);=> implicitInvariant(x,e,f);
[true:error,found :true]
{
2 :             g :=f ;
2.1:            invariant h:=e;
                while
                {
2.9 :   invariant { implicitInvariant(x,h,g);
2.9.1:                      removeFirst(__,h,h+); }
3 :             [empty :error]removeFirst(y+,g,g+);
4 :             [true:found,false :true](x=y) ;
                }
}
```

Obviously if the new version is proven, this will be sufficient to deduce that the previous version is secure. In order to prove it, it must be proven that some transitions leading to error are indeed impossible. One such proof is illustrated here. Particularly, it is shown for the following logic trace, which directly corresponds to the first logic trace of the previous version (the only difference coming from the presence of program invariants):

```
[true]addLast(x0,e0,f0+) ;
[true]addLast(x0,e0,f1+);
[true]implicitInvariant(x0,e0,f1);
[true]g0 :=f1 ;
[true]h0:=e0;
[error]implicitInvariant(x0,h0,g0);
```

By applying the transitive congruence closure, the following is obtained:

```
[true]addLast(x0,e0,f0+) ;
[true]addLast(x0,e0,f0+);
[tme]implicitInvariant(x0,e0,f0);
[true]f0 :=f0 ;
[true]e0:=e0;
[error]implicitInvariant(x0,e0,f0);
```

This trace is clearly impossible as implicitInvariant cannot yield two different results, or labels when applied to the same value, hence the proof of impossibility.

This example also illustrates a possible implementation of program matching (or variable instantiation presented in the previous section). Here a first program invariant is added at 1.1, that is an instance of the axiom (2a) to use. The place of insertion has been identified so as to allow the correct instantiation of axiom variables with values already present in the context of the target program. The axiom added (it could be any lemma of course) becomes an invariant which is usable by the rest of the program for proof purpose. Of course, such intrusive modification (only for the purpose of illustration feasibility) is not necessary, and program modification can be done in a much more efficiently without modifying the target program.

The two previous sections also illustrate the use of a local property defined by ways of another program (i.e. a program invariant in the first case and an implicit invariant in the second).

4.5. Replay

The previous example illustrates also the specific case of replaying the same command with the same values in the same logic trace. If the command is fully deterministic, for example, not only the same label but also the same return values are returned. This can be used either to generate new congruence, or detect impossibilities as above. In the previous section it was also used on the second uses of addLast at point 1.1 (i.e. the premises of the first program invariant can only be positive).

4.6. Use of Program Analysis Techniques for the Proof. Automatic Generation of Invariants In embodiments, it has been shown that it is possible to assign to each logic trace a conjunction of predicates dealing with the logic variables corresponding to the values of the variables throughout the execution of the trace.

Thus, for a program point that is only attainable by a finite number of routes and thus of logic traces (that are prefixes in this instance since they lead from an entry point in the program to a point that is not necessarily a program exit), one has, by taking the disjunction of conjunctions obtained on each of the logic traces allowing to reach this point starting from the start point/start points of the program (precondition included), an invariant at the given point. Thus, one has a manner to automatically generate relatively rich invariants in such points. It is even possible to show that under certain conditions, particularly when the predicates associated with the transitions completely specify the latter, the invariants that are thus built are the strongest invariants which are contained (and are thus expressible) at theses points.

However, the points that can be reached by only a finite number of prefixes/logic traces are rare in the most standard programs. Generally, there are numerous loops, which is the reason why for most of the points, there is an infinite number of logic traces leading to these points (a certain number of loops are taken often in an unbound number of times before reaching this point). In the general case where there are cycles leading to the point of interest, one can nevertheless everything extract a program which characterizes the properties in this point. For a deterministic execution model, it is generally sufficient to delete all program exits, and to add the point of interest as a possible exit from the program (exit by which one can potentially loop before definitive exit, a case which requires certain precautions and quite natural adaptations, which are not presented here) and to then delete the dead branches. By doing this, a program associated with the point of interest is obtained, representing in a form proper to the present invention, an invariant at this point. Embodiments have also shown how to adapt this in the case where the point of interest is found inside the loops.

In an embodiment, if an invariant that can be expressed in a classic formalism (rather than in the form of a program) is required, generally the method that is proposed here consists on the one hand in limiting oneself in an automatic or an assisted manner to a finite number of representative logic traces (each of these logic traces can be the approximation of a generally infinite set of logic traces of the start program) and such that for calculating the invariant in a program point or along a trace, it is sufficient to use the representative trace/traces and the manner in which it/they correspond with the traces or the points in question. It is supposed that only prefix routes are generated and hence the logic trace prefixes do not loop back to themselves (if an extension of a prefix reloops on an already present point in the prefix, the new extended prefix is ignored by adding a step as well as all its potential extensions). The set of these logic prefixes is finite and is easy to compute.

In an embodiment, consider the points of a program on which the latter can loop, and one can suppose that we have successfully obtained an approximation function "f" which makes it possible to assign to each of these points a relationship describing an approximation of the effect of the execution of loops (there can be several possible branches for a looping point; furthermore, the same loop can be generally iterated several times and this also constitutes a loop) in this point. In other words, this function assigns to a looping point a relationship which includes each of the relationships inferred from each of the logic sub-routes leading from this point and back to itself. By way of example, it is proposed here to assign to such a logic sub-route, the approximation based on the congruences which exist between logic variables in loop entry and exit, or at least the congruences that one can calculate automatically (by closure application of the aforementioned transitive congruence closure). Such relationships are of course in general approximations. Intuitively, such approximation will maintain precisely the equality (i.e. congruence more generally), between values of variables before execution of the given branch of the loop and values after execution, including in cases where values might have changed and reset to original values. They will also maintain other equalities between values of variables of a given state, but will release all other constraints. Thus for example in a loop branch where a variable "x" is incremented, and another variable left unchanged the approximation will be that which keeps "y" unchanged and leaves "x" potentially take any new value. A loop can typically contain different branches, and that theses can be repeated, thus a simple computation of fixed point will allow to easily combine the different approximant relationship found for each branch. This fixed point computation can be generally obtained in a simple manner. For example, in the case of a structured program, all that is needed is a pass obtained by going through the tree structure of the program: the program flow control can indeed be seen as a tree, provided that each transition that loops back on itself is seen as a leaf of the tree; to each of these nodes identifying a potential loopback, one calculates the effect of the particular branch of the loop by means of an application of transitive congruence closure, and extraction of only the congruence relationships, then if necessary one updates (here by releasing potentially some of the equalities) the relationship associated with this point by the function "f" being built (fixed point mechanism). In the case of a non-structured program one can either first return to an equivalent but structured program, or compute a more precise function "f" which, instead of taking its values on the looping points of the program, takes them on the prefixes (logic or structural prefixes) leading to a potential looping point (that is to say given a prefix without a loop, leading from an entry, let us say (n0), to a point, let us say (nk), the prefix being of the form (n0)->P . . . (nk)) and another prefix englobing the first one by adding a loop, and thus of the form, (n0)->P . . . (nk)->R (nk), the function « f» defined on the prefixes without loop of the program, will associate with the first prefix prefix, a relationship L, such that the relationship M corresponding to the logic trace (nk) . . . ->R (nk), i.e. the branch of the loop completing the first prefix to make it the second, will be like $M \subseteq L$.

In embodiments, attention is now restricted to the case where the program is structured, bearing in mind that the transposition to the general case can be simply obtained.

Once these approximations computed for each looping point of the program of interest, which will be hereinafter named the first program, in an embodiment, one can build a second program, without loop, by removing from the first program the looping arcs, identified during the previous step, then by replacing one by one each of the old looping points, let us say, each of the by two points, let us say $n_i^a$, and $n_i^b$, the first receiving the entry arcs of $n_i$, and the other the exit arcs of $n_i$, then by linking the first $n_i^a$, to the second $n_i^b$, by a program oriented arc leading from $n_i^a$ to $n_i^b$, and annotated by the approximate function corresponding to $n_i$(i.e. $f(n_i)$). One can then clean the obtained program in order to remove the dead branches, then associate sufficiency relationships between arcs and points which are found in the two programs, that is to say, prove a branch to be impossible (i.e. a local property) of the first program all one needs to do is prove that the same branch is impossible (i.e. the same local property is satisfied) in the first program, in the case of course where the branch (i.e. the program point) has been kept by the transformation. Some additional sufficiency relationships can also obviously be added between some points of the modified structure. This is not described here for simplicity.

In an embodiment, the second program being without loop by construction the automatic construction of invariant described at the beginning of this section can be used to generate and prove invariants and then to propagate the properties into the first program.

However, it is more convenient to propagate the automatically generated invariants from the second program into the first program for the nodes which remain unchanged, but also for the looping nodes, by considering for the second ones that it is the node $n_i^b$ that corresponds to a looping point $n_i$. Typically, each time in a route of the first program a same program point, $n_i$, is taken one or several times, the possible looping sequence is removed and replaced by a simple step where one goes from the first node $n_i^a$, to the second one $n_i^b$ while carrying out a transformation (potentially non deterministic) corresponding to the approximation relationship associated with $n_i$. The first point $n_i^a$ in the trace of the second program hence representing the first passage to point $n_i$ in the first program, and the second point $n_i^b$ representing the last passage to point $n_i$. Of course, it is not necessary to explicitly construct the second program, nor to explicitly establish the sufficiency relationships. In embodiments, the number of steps can be reduced particularly for the sake of optimization. Whatever the case it leads to provide a method for the prover to generate and automatically prove invariants in the start program.

Thus, given a program point, having thus obtained a finite set of approximate logic traces, the prover can, by using the technique described at the beginning of this section, automatically generate (or process without making it explicit which amounts to the same thing) an invariant at this point. For this, one will have in a certain manner used approximate versions of execution routes which lead thereto, wherein the parts representing the execution of loops have been replaced by approximated steps. These approximations are hence done at logic traces, which each typically represent an infinity of possible execution traces.

In embodiments, function "f" used in this method can be based on different types of approximation principles. The simple and efficient principle used here by way of illustration consists in approximating the removed branch/branches (of the loop) by considering the effect of the loop as a relationship which preserves the value of certain variables, which amounts to searching the variables whereof the value is kept by the loop (whatever the branches used and the number of times it is looped) Of course a simple classic static research of the modified variables in the core of the loop can be enough.

By applying this principle to the TheoremUnfold program, a loop invariant which describes the link between the three logic variables associated with x, e and f, (let us say x0,e0,f0), typically [true] addLast(x0,e0,f0+) is automatically generated. Additionally this property is part of most invariants that would be generated that way on other points of the program.

Here, it is obvious that the core of the loop does not modify the variables which the loop invariant represents, however one can easily imagine a situation where a variable is modified in a loop before putting it at its value of start of loop one would have preserved the value whereas the variable has been modified (that is to say, the branch of the loop «buffer :=x; x:=x+1; <body of the loop>; x:=buffer; preserves the value of «x» even though it has been modified twice). The same technique applied to this slightly less simple alternative gives exactly the same loop invariant.

In embodiments, other approximations than those based on the conservation of certain values of variables are possible, for example if a variable is modified by a transformation corresponding to a transitive and reflexive relationship (for example each loop increments a variable), the relationship >=can be an approximation for this variable (the reflection is important here as the loop cannot be executed)

4.7. Generation of Code that Takes Advantage of Local Property Proof

In embodiments, it is generally possible to generate implementation code when the model is sufficiently refined. This is, for example, the case for the SM environment. The generation tools can then take advantage of the fact that some of the impossible transitions or local properties have been proven so to optimize the generated code. For example, if a stated impossible transition, for example [empty:error] removeFirst(y+,g,g+); at a given program point, has not yet been proven correct at the time of the generation, the generation will likely need to generate some code for the handling of the normally "impossible" case. In the example in the case "g" is empty when the program is called the normal flow of the program which will likely make use of the result value present in "y" is not used, and an escape mechanism is required and need be generated. In the case where this impossible transition is already proven at generation time, such specific treatment is not necessary and the generated code can be optimized accordingly.

Additional examples:

Here a few new usage examples are introduced.

Prog1:
[empty:false]removeFirst(x+,e,g+);=>[false: error]member(x,e);

In an embodiment, this first program expresses that if "x" is in first position of the sequence "e", it means that "x" belongs to "e". In SM one has thus expressed that by saying that the "false" case for "member" is "impossible" when called in this context. This program thus has here one single associated local property, expressed under the form of a transition impossibility. The case "false" of "member" is renamed into "false" which considering the semantics of the implication is a direct exit of the program towards "true". Let us now see the program obtained by unfolding "member", and then optimize with an optimization where two successive branching are replaced by one: the loop of "member" could either terminate with equality of the sought value and the current value (branch "true" of the equality in 3), or because the end of the loop has been reached (branch "empty" of "removeFirst" in 2). In the second case one was branched just before the loop (empty: exit), then one exited the program with "false", and hence here "error", the unauthorized branch. Here, one replaces by one single branching for the sake of simplification (that is to say, [empty: error] in 2). This of course is a program transformation that is to be checked by the prover. More precisely the prover here establishes sufficiency properties between the two versions of the program.

```
Prog2:
0: [empty :false]removeFirst(x+,e,g+) ;
=>
[found :true]
{
1:           f :=e ;
             while
             {
2:               [empty :error]removeFirst(y+,f,f+) ;
3:               [true:found,false :true](x=y) ;
             }
}
```

In this instance, the two steps which have allowed creating Prog2 mean that if one proves the impossible branch of Prog2 (more precisely if one proves that the branch declared as impossible really is impossible), one also proves the impossible branch of Prog1. One has hence established a sufficiency relationship between these two local properties of these two programs. Here, the two programs are incidentally equivalent in SM, as the two transformations preserve the equivalence, however this is neither required nor used here. Now, a new transformation is applied, that is to say, that obtained by unfolding the loop (that is to say, an instance of the body is placed in front of the latter) which here, is also an equivalent transformation.

```
Prog3:
0: [empty :false]removeFirst(x+,e,g+) ;
>
found :true]
1:           f :=e ;
2.1:         [empty :error]removeFirst(y+,f,f+) ;
3.1:         [true:found,false :true](x=y) ;
             while
             {
2:               [empty :error]removeFirst(y+,f,f+) ;
3 :              [true:found,false :true](x=y) ;
             }
}
```

Here too, if the two impossible branches of Prog3 are proven, the impossible branch of Prog2 is also proven, which itself makes it possible to prove that of Prog1. have thus established a new sufficiency relationship in these programs, again by transforming one program, so as to obtain another one. Here for the sake of readability, a last modification is added, to obtain the Prog4 program. It consists in a syntactic modification which does not even modify the underlying SMIL, and thus establishes new sufficiency relationship in an obvious way.

```
Prog4 :
    [falsepremisses:true, trueconclusion :true]
    {
    0:          [empty :falsepremisses]removeFirst(x+,e,g+) ;
    1:          f :=e ;
    2.1:        [empty :error]removeFirst(y+,f,f+) ;
    3.1:        [true:trueconclusion,false :true](x=y) ;
                while
                {
    2 :             [empty :error]removeFirst(y+,f,f+) ;
    3 :             [true: trueconclusion,false :true](x=y) ;
                }
    }
```

Then, one applies the transitive congruence closure on the routes leading to 2.1. Here, in order to simplify, one does not systematically name the logic variables created, but in this case characterizes them in a non ambiguous manner. Hence, in 2.1 one has the following equivalence classes: the logic variable associated with "f" in 2.1 (the one before the instruction call) is equal to that associated with "e" in the three points 0, 1, 2.1. Let "e0" be called the logic variable used hereinafter as representing this equivalence class. One single route leads to 2.1, and it is to be noted that on this route one has inevitably passed by the branch "true" of the instruction located in 0, meaning that the predicate "[true] removeFirst(x0+,e0,g0+)" is true for the values of logic variables "x0, and "g0" respectively corresponding to variable "x" and "g", in 1 (as well as in 2.1 incidentally). If one now focuses on the transition in 2.1 which corresponds to the case "[empty:error] removeFirst(y+, f, f+)", it is hence easy to show that this case is impossible, which is precisely what we want to show. In fact, if it were possible there would be two possible cases for "e0" (it is to be remembered that fin this point has the value of the logic variable "e0") whereas removeFirst is functional (as well as deterministic). If one focuses now on the other case, that is to say, the case "true", it will take us to 3.1 then thanks to the same property one can prolong the transitive closure by establishing that the logic variable corresponding to "f" is in the equivalence class of "g0", that corresponding to "y" is in the equivalence class of "x0", that corresponding to "x" is "x0", which allows one to show by proceeding as before that the transition of this point on the case false of the equality is impossible, which allows us by cleaning/pruning of the program graph to delete the graph which corresponds to the loop while. We remark that the different operations applied to Prog4 can be obtained in an entirely automatic manner by application of the transitive congruence closure procedure on the equality by traversing the graph of the program, then by static cleaning of the graph, in order to obtain a new graph (or equivalent program which is entirely proven). This makes it possible to entirely prove Prog4, then by propagation along sufficiency relationships to prove (all properties of) Prog3, then Prog2, and so on and so forth until Prog1. The invention has been illustrated and described in detail in the drawings and the previous description. It must be considered as illustrative and given by way of example and not for limiting the invention to this sole description. Numerous alternative embodiments are possible.

For example, the means for computation and memorization can include material accelerators such as high-performance graphic processors, which make it possible to parallelize numerous computations. A material accelerator can also be especially developed, for example by the FPGA programming (Field Programmable Gate-Arrays).

In the claims, the word "comprising" does not exclude other elements and the indefinite article "a" does not exclude a plurality.

The invention claimed is:

1. A method for securing a first program with a computer system including a processor and memory, the first program comprising a finite number of program points and evolution rules associated with the program points and defining the passage from one program point to another program point, the first program having to be executed in a given program context, the method comprising:

defining with the computer system a plurality of exit cases in a non-transitory computer readable medium and, when a second program is used in the definition of the first program, the second program defining a subroutine of the first program and the second program comprising a finite number of program points and evolution rules associated with the program points and defining the passage from one program point to another program point and for each exit case of the second program, defining a branching toward a specific program point of the first program or a declaration of branching impossibility, the branching impossibility being a normally possible transition to be proved impossible in the given program context, and wherein the branching impossibility is proven by at least one of analyzing an execution route analyzing a tree structure of an execution trace, or analyzing a logic traces route leading to the transition;

defining with the computer system a set of local properties to be proven, each local property associated with one or more of the program points and evolution rules of the first program, said set of local properties comprising the branching impossibility as a particular local property; and establishing a formal proof of the set of properties absent a concrete execution of either the first program or the second program.

2. The method according to claim 1, wherein the evolution rules, the exit cases, and the branchings define a tree structure of logic traces, and wherein a prover uses the tree structure to propagate constraints in points of the first program and uses at least one transitive closure of explicit or implicit congruences to prove at least one of the local properties of the first program.

3. The method according to claim 1, further comprising securing a third program, wherein the third program is different than the first program or an abstraction of the first program.

4. The method according to claim 3, further comprising establishing oriented correspondences, or sufficiency relationships, between a first local property of the first program and a set of the local properties of the third program, such that proving the first local property of the first program is sufficient to prove the set of properties of the third program, whenever such correspondences exist.

5. The method according to claim 3, wherein at least one variable of the third program is instantiated using values taken by at least one variable of the first program to draw up at least a sufficiency relationship between the first program and the third program, or as a way of securing the first program.

6. The method according to claim 1, wherein at least one of the set of local properties is defined by a fourth program.

7. A system for securing a first program, the system comprising:
- a computing platform having a processor, data storage, and a user interface, the computing platform containing instructions that, when executed by the computing platform, cause the computing platform to:
  - present a first program on the user interface, the first program comprising a finite number of program points and evolution rules associated with the program points and defining the passage from one program point to another program point, the first program having to be executed in a given program context;
  - define, in the data storage, a plurality of exit cases and, when a second program is used in the definition of the first program, the second program defining a subroutine of the first program and the second program comprising a finite number of program points and evolution rules associated with the program points and defining the passage from one program point to another program point and for each exit case of the second program, defining a branching toward a specific program point of the first program or a declaration of branching impossibility, the branching impossibility being a normally possible transition to be proved impossible in the given program context, and wherein the branching impossibility is proven by at least one of analyzing an execution route analyzing a tree structure of an execution trace, or analyzing a logic traces route leading to the transition;
  - define, in the data storage, a set of local properties to be proven, each local property associated with one or more of the program points and evolution rules of the first program, said set of local properties comprising the branching impossibility as a particular local property; and
  - establish a formal proof of the set of properties absent a concrete execution of either the first program or the second program.

8. The system according to claim 7, wherein the evolution rules, the exit cases, and the branchings define a tree structure of logic traces, and wherein a prover uses the tree structure to propagate constraints in points of the first program and uses at least one transitive closure of explicit or implicit congruences to prove at least one of the local properties of the first program.

9. The system according to claim 7, further comprising securing a third program, wherein the third program is different than the first program or an abstraction of the first program.

10. The system according to claim 9, further comprising establishing oriented correspondences, or sufficiency relationships, between a first local property of the first program and a set of the local properties of the third program, such that proving the first local property of the first program is sufficient to prove the set of properties of the third program, whenever such correspondences exist.

11. The system according to claim 9, wherein at least one variable of the third program is instantiated using values taken by at least one variable of the first program to draw up at least a sufficiency relationship between the first program and the third program, or as a way of securing the first program.

12. The system according to claim 7, wherein at least one of the set of local properties is defined by a fourth program.

13. A system for securing a first program, the system comprising:
- a computing platform having a processor, data storage, and a user interface, the computing platform containing instructions that, when executed by the computing platform, cause the computing platform to implement:
  - a first program presentation engine configured to present the first program over the user interface, the first program comprising a set of run commands, each command being associated with a program point, the first program having to be executed in a given program context;
  - a constraints definition engine configured to define at least two domains for each command in the set of run commands, each domain defining a branching toward a specific program point of the first program or a declaration of branching impossibility, the branching impossibility being a normally possible transition to be proved impossible in the given program context, and wherein the branching impossibility is proven by at least one of analyzing an execution route analyzing a tree structure of an execution trace or analyzing a logic traces route leading to the transition;
  - a logic tree structure generator configured to generate a data structure having a plurality of branches corresponding to each domain and stored in data storage;
  - a prover engine configured to analyze the logic tree structure to generate a constraint at each program point and use transitive closures and properties of congruence or functionalities to delete useless branches to formally prove the first program.

14. The system according to claim 13, wherein the constraints definition engine is further configured to define the first program with a second program, the second program defining a subroutine of the first program and the second program comprising a finite number of program points and evolution rules associated with the program points and defining the passage from one program point to another program point and wherein for each exit case of the second program, the constraints definition engine is configured to define a branching toward a specific program point of the first program or a declaration of branching impossibility.

15. The system according to claim 13, wherein the logic tree structure generator is configured to flatten the data structure by generating only branches that correspond to a branching toward specific program points that are possible to take.

16. The system according to claim 13, wherein when the first program comprises a loop, the logic tree structure generator is configured to generate an invariant by identifying the domain without loops and duplicating variables possibly modified by the loop.

17. The system according to claim 13, wherein the user interface is configured to present a plurality of exit cases of the branchings toward the specific program points of the first program and the declarations of branching impossibility, and wherein the user interface is utilized to select a subset of the plurality of exit cases.

18. The system according to claim 13, further comprising recursively executing the first program presentation engine, the constraints definition engine, the logic tree structure generator, and the prover engine to define a third domain for a command in the set of run commands or modify one of the at least two domains having a branching impossibility so the branching impossibility cannot occur.

* * * * *